Oct. 15, 1929.  H. B. SCOTT  1,731,912
WASHING APPARATUS
Filed Jan. 22, 1923   7 Sheets-Sheet 1
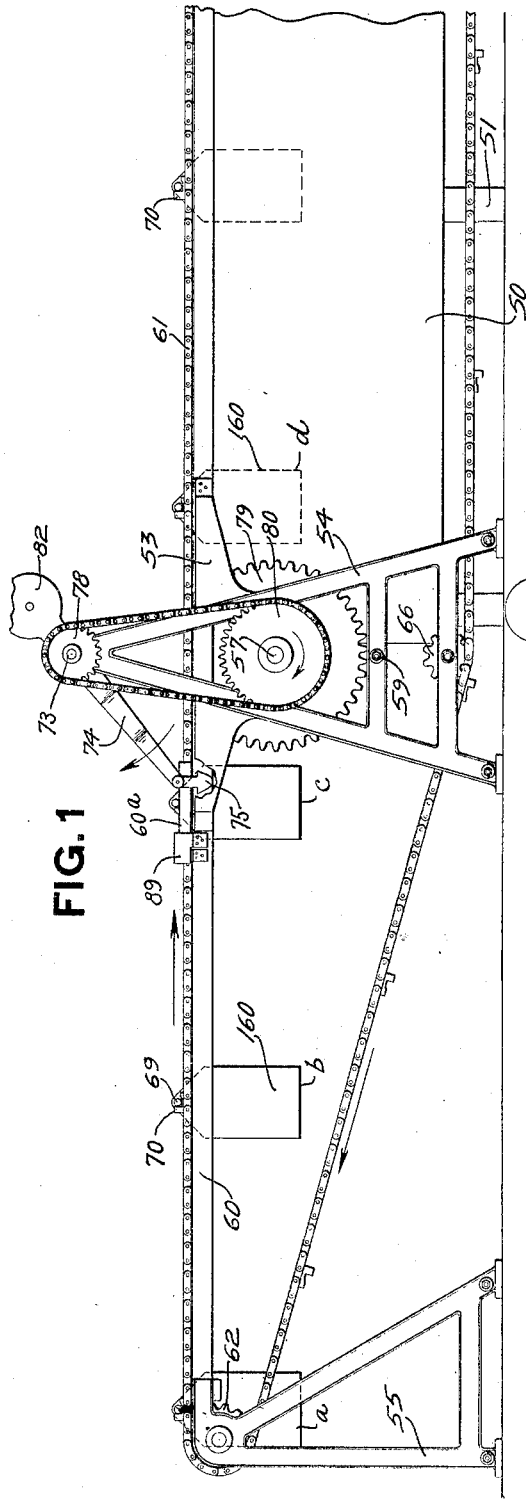
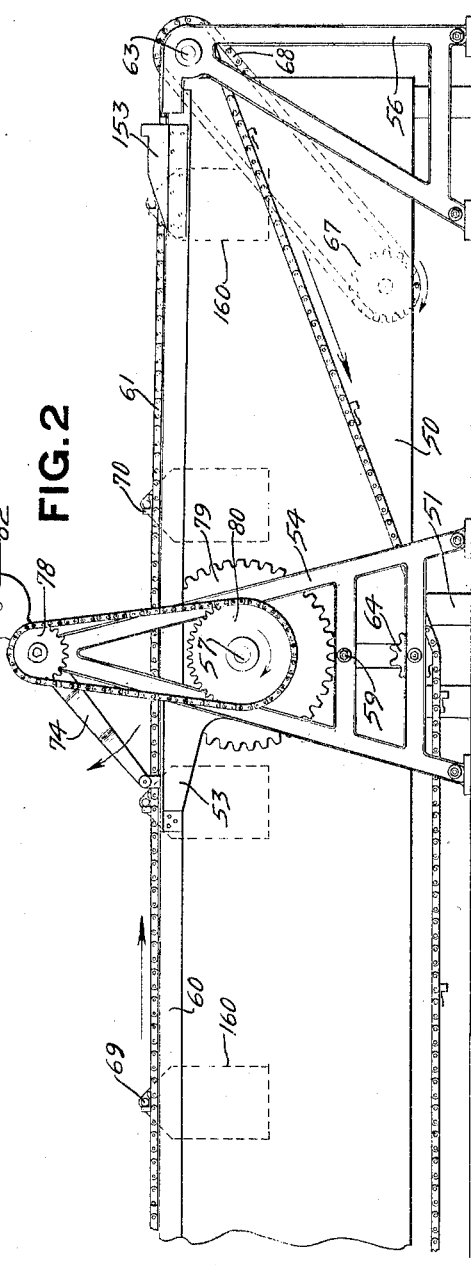
Inventor
Howard B. Scott
By Pearl Beust
Henry E. Stauffer
His Attorneys

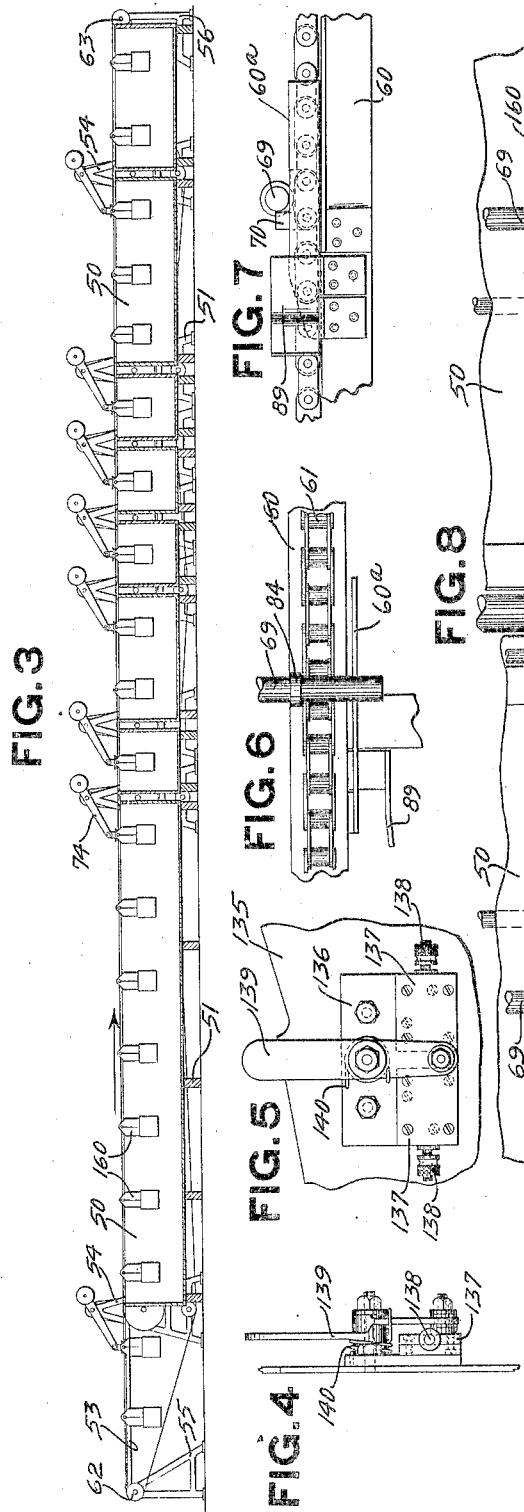
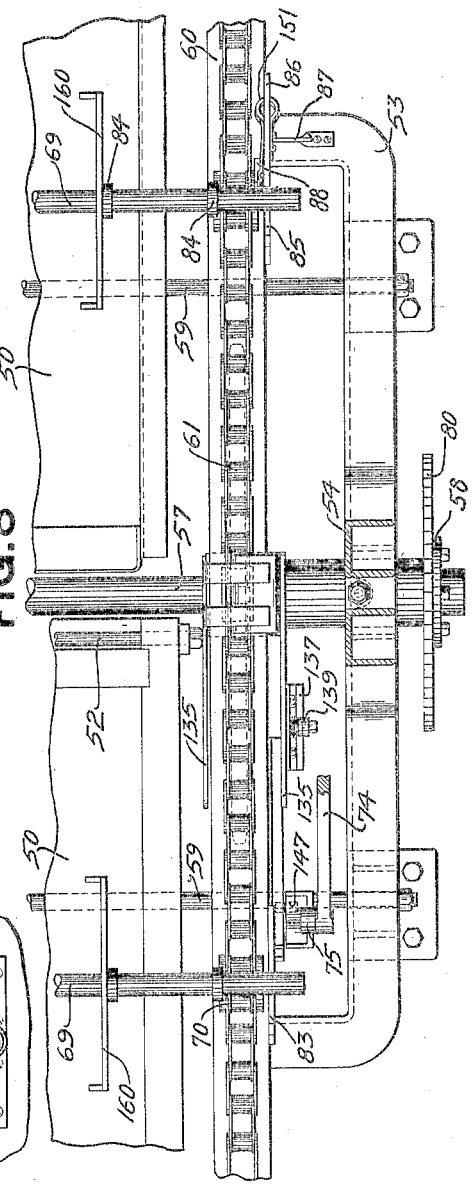

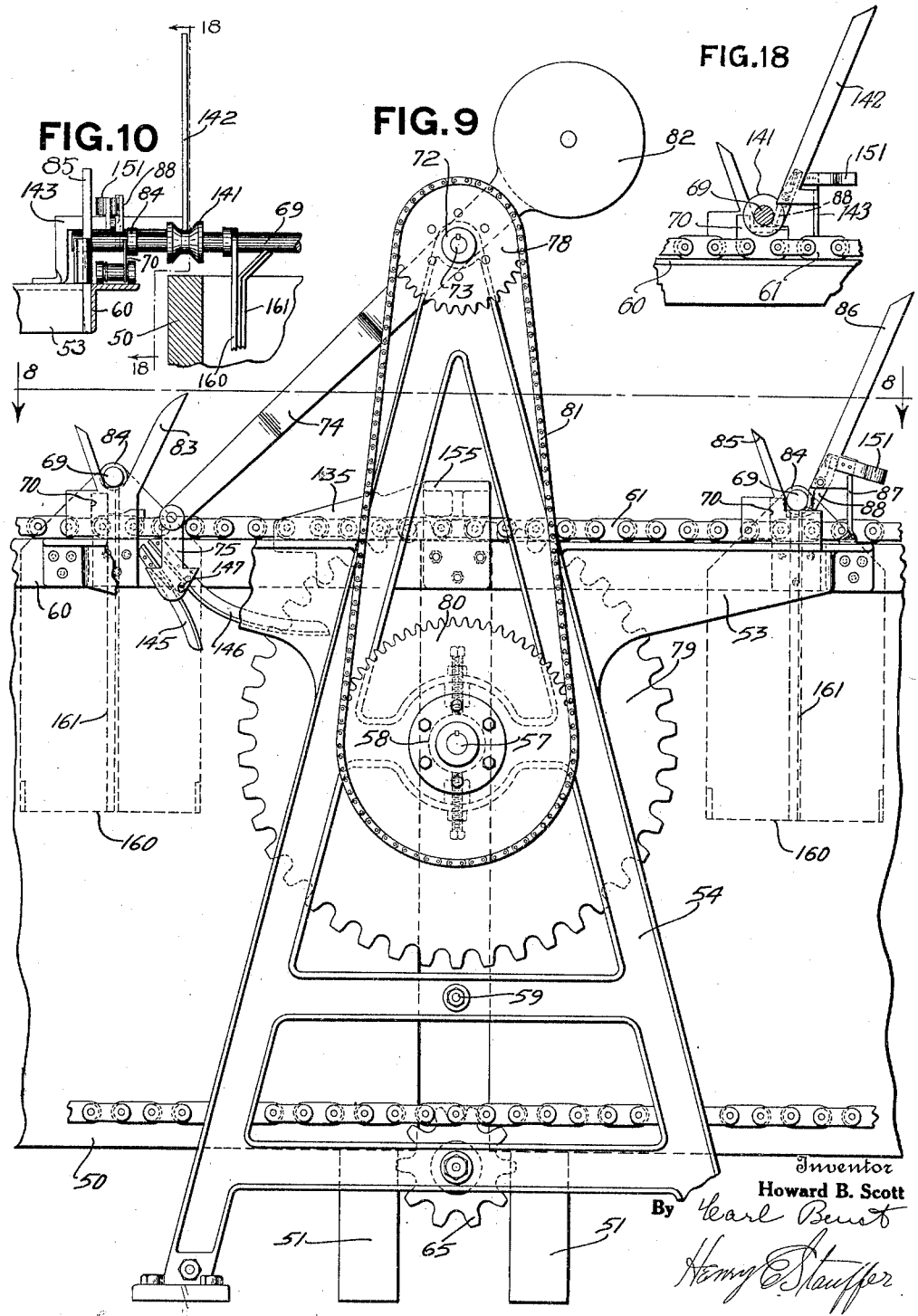

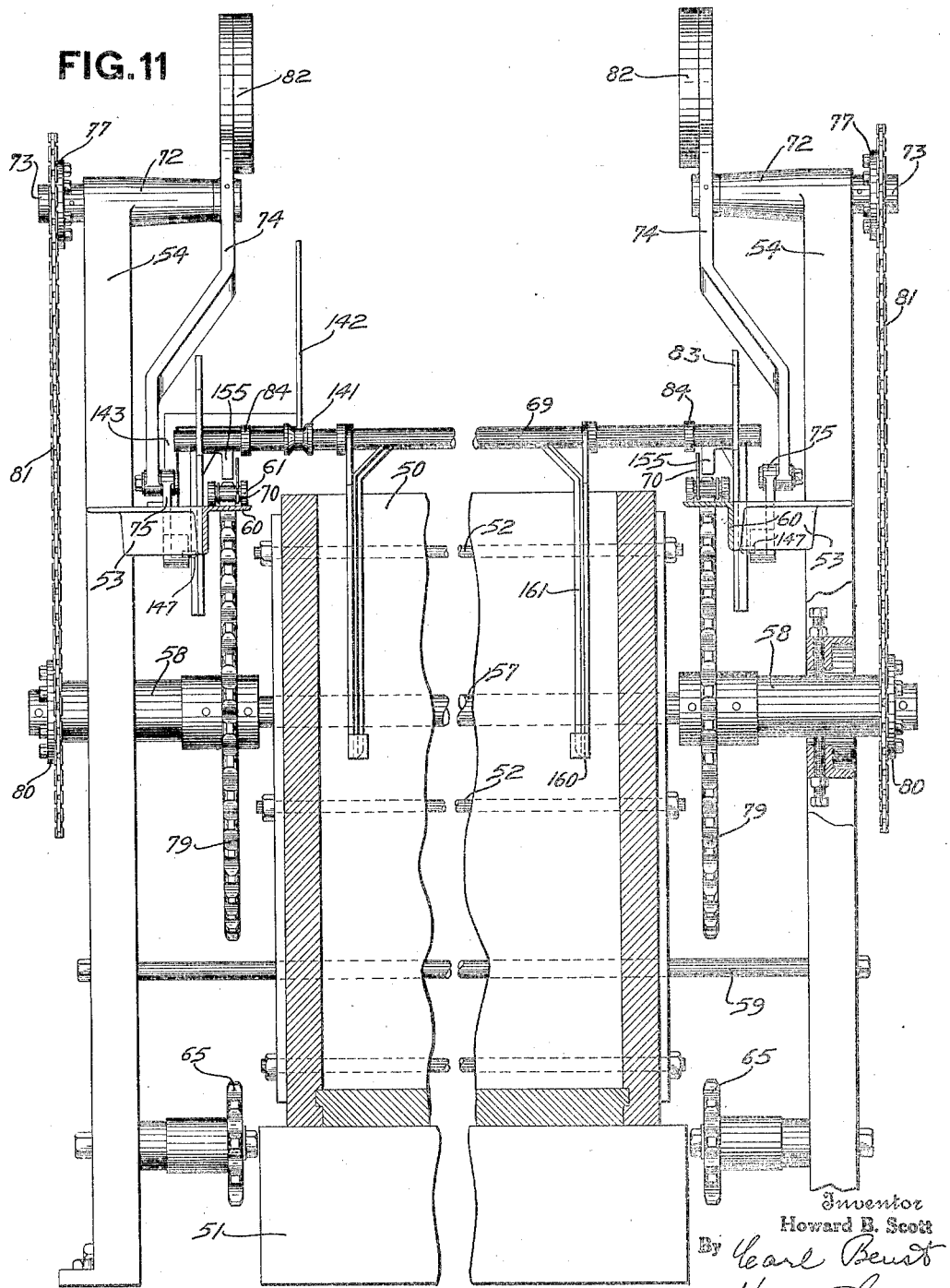

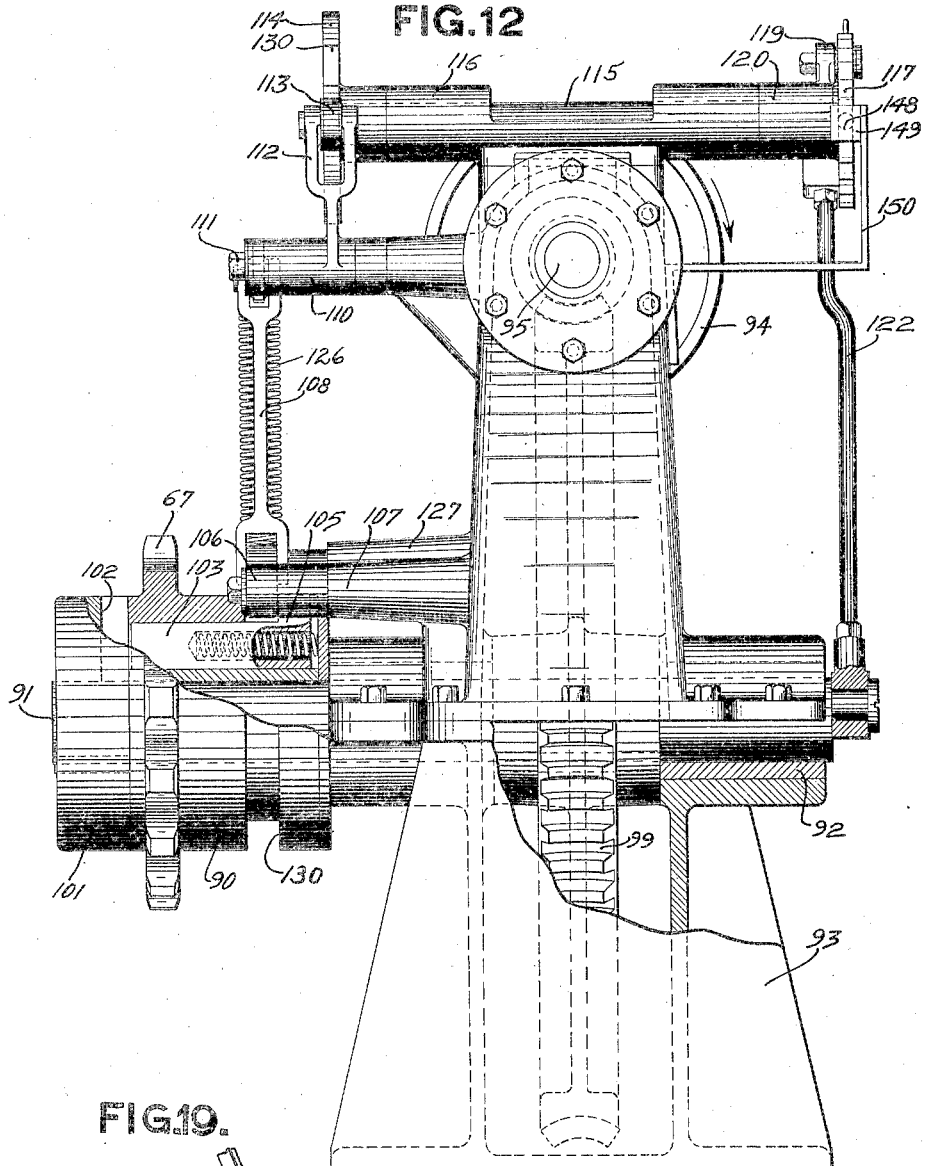
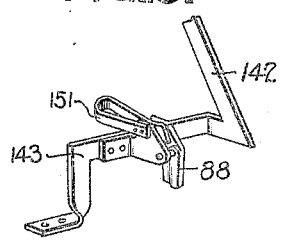

FIG.13

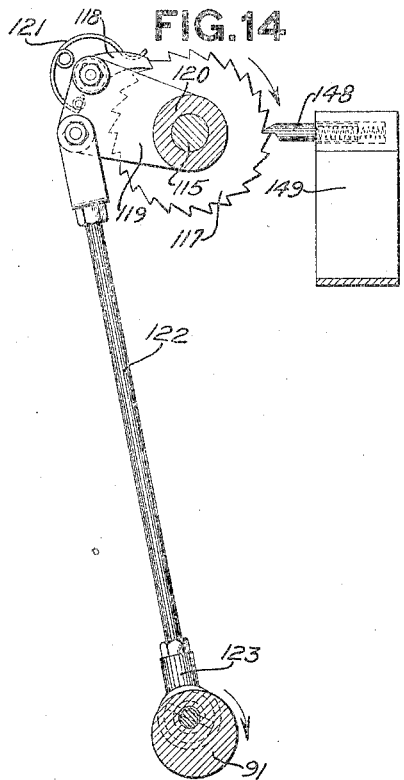
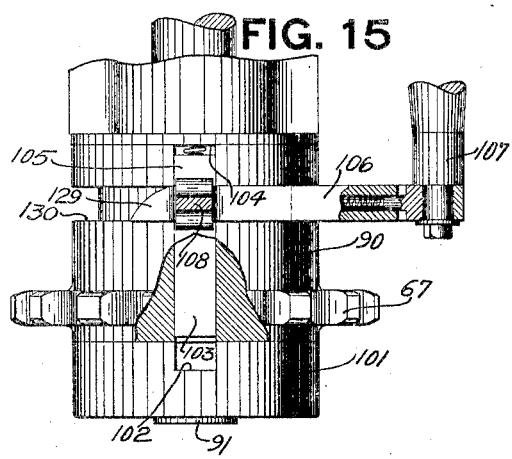
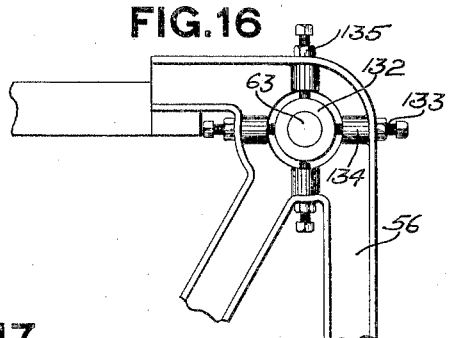
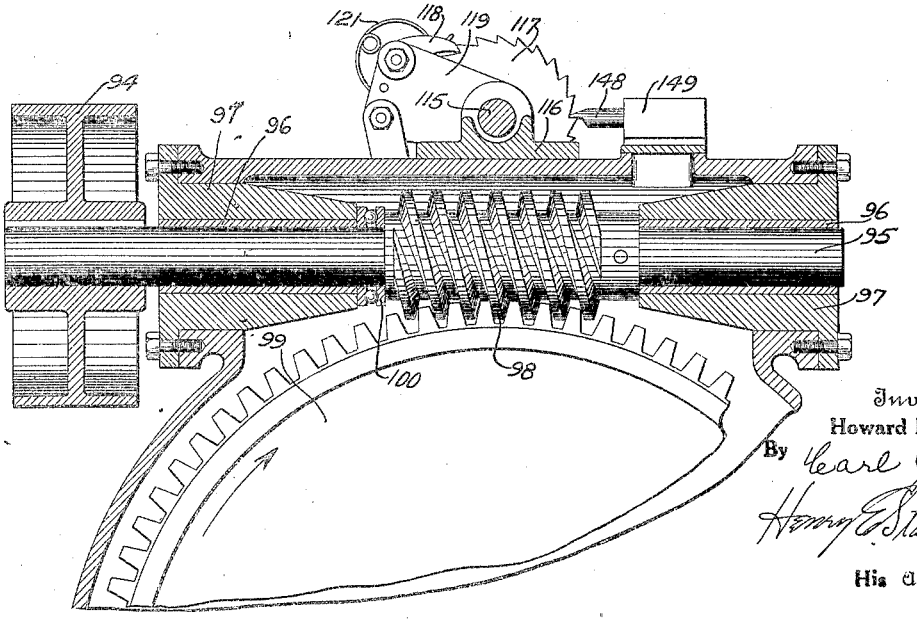

Patented Oct. 15, 1929

1,731,912

UNITED STATES PATENT OFFICE

HOWARD B. SCOTT, OF DAYTON, OHIO, ASSIGNOR, BY MESNE ASSIGNMENTS, TO THE NATIONAL CASH REGISTER COMPANY, OF DAYTON, OHIO, A CORPORATION OF MARYLAND

WASHING APPARATUS

Application filed January 22, 1923. Serial No. 614,257.

The principal object of the present invention is to provide a machine for washing metal parts.

Another object is to construct such a machine that it will effect the entire washing operation automatically, the only human agency necessary being someone to place the material to be cleansed in one end of the machine and remove it from the other end.

It is another object to include in the device means whereby the material can be retained in a certain cleansing fluid for any desired length of time.

Still another object is to automatically transfer the material from one of the cleansing fluids to another.

Another object is to automatically stop the machine in case the means for supporting the material is not placed in proper position to be engaged by the transporting mechanism.

With these and incidental objects in view, the invention consists of certain novel features of construction and combinations of parts, the essential elements of which are set forth in appended claims and a preferred form or embodiment of which is hereinafter described with reference to the drawings which accompany and form part of this specification.

Of said figures:

Fig. 1 is a side elevation of the left, or receiving end, as seen in Fig. 3.

Fig. 2 is a side elevation of the right, or discharging end, as seen in Fig. 3.

Fig. 3 is a diagrammatic sectional view through the entire machine.

Fig. 4 is a detail side elevation of the mechanism for breaking the electric circuit controlling the driving means upon certain contingencies arising in the operation.

Fig. 5 is a detail front elevation of the mechanism shown in Fig. 4.

Fig. 6 is a top plan view of the guide plates used to insure the lateral alinement of certain parts.

Fig. 7 is a side elevation of the mechanism shown in Fig. 6.

Fig. 8 is a detail top plan view, partly in section, taken on line 8—8 of Fig. 9, looking in the direction of the arrows.

Fig. 9 is a detail side elevation of one of the lifting units.

Fig. 10 is a detail end view of the mechanism for guiding the rod on the discharging side of certain of the lifting mechanisms.

Fig. 11 is a section through the machine, looking towards the discharging end thereof.

Fig. 12 is an end view of the timing and driving mechanism of the machine.

Fig. 13 is a side elevation of the timing and driving device.

Fig. 14 is a detail view of the ratchet for driving the timing cam.

Fig. 15 is a top plan view of the clutch mechanism.

Fig. 16 is a detail side elevation of the means for tightening the chains.

Fig. 17 is a detail sectional view through the worm gear and shows the means for mounting said gear.

Fig. 18 is a side view of the mechanism shown in Fig. 10.

Fig. 19 is a detail view of the frictionally retained latch and its associated holder.

General description

The machine of the present invention is primarily adapted to be used for cleansing metal parts.

In order to properly cleanse such parts they are immersed in various solutions in which they will remain for various periods of time, depending on the nature of the solution.

The present machine, therefore, includes eight tanks or vats each of which contains a cleansing fluid. The several tanks are preferably arranged in line, with their upper edges lying in substantially the same horizontal plane. The number of tanks and the contents thereof can, of course, be varied without departing in any way from the spirit of the invention. In the embodiment selected for illustration of the invention, the solutions used in the various tanks in the order in which the material is immersed therein are as follows: potash solution, cold water, muriatic acid, cold water, cyanide, cold water, hot water and warm water. Iron tanks are used for the potash solution, the cyanide, and the hot water, and a pitch lined wooden tank for the acid. It is, of course, understood that any suitable solutions and tanks therefor can be used with the present invention, and it is not desired to limit the scope of this invention in any way to the use of these solutions and materials.

Running on each side of said line of tanks is a continuous chain, the two parallel chains or conveyor mechanism operating to supoprt the material to be washed, and to transport such material through the tanks, by intermittent movements.

Lifting means are provided for transferring the material from one tank to the next when said material reaches the end of the first mentioned tank. It is evident that the length of the tank determines the period of time the material will remain in any solution.

The driving means for said chain consists of a continuously operating driving member and a member driven thereby, and means for clutching the two together automatically at specified intervals, in order to drive said pair of chains or conveyer mechanism and lifting mechanism intermittently. Thus it will be seen that a common driving mechanism operates the conveyer mechanism and the lifting or transferring mechanism.

Tanks

There are a plurality of tanks 50 (Figs. 1, 2, 3, 8, and 11), each supported on sills 51. The side walls of each of the wooden tanks extend slightly beyond the end walls thereof and the side walls are held in contact with the end walls by three rods 52 (Figs. 8 and 11) which pass through the extended portions of the side walls at each end of these tanks. All of the tanks are placed in a line, and all are of the same width, but not necessarily of the same length. The length of the tank depends upon the period of time that it is desired to keep the material being washed in the particular solution carried by the tank. The wooden tanks are lined with pitch or any other suitable material so as to make them watertight.

Along each side of the tanks are a plurality of large A-frames 54 located at the various points where the tanks join. Oppositely located brackets 53 extending laterally from the respective A-frames, support angle irons 60, the angle irons lying parallel, and in substantially the same horizontal plane with the upper edges of the sidewalls of the tanks 50. The angle irons on each side of the line of tanks, connect the several A-frames, and form a continuous track. At the extreme left hand, or receiving end, of the machine (Fig. 3) the angle irons 60 are supported by vertical members 55, and at the extreme right hand, or discharging end, by similar members 56. The A-frames 54 on one side of the line of tanks are positioned opposite the row of A-frames on the opposite side of the line of tanks, the opposing A-frames of each pair being tied together by means of a shaft 57 which is rotatably mounted in bearings 58 (Figs. 9 and 11), and also by a rod 59 extending between the ends of the tanks.

Driving chain

The angle irons 60 which extend along each side of the series of tanks, form tracks upon which continuous or endless chains 61 are adapted to lie. At the left hand end of the machine, these chains pass around sprocket wheels 62, then extend the length of the machine supported on the tracks 60, and at the right hand end, the chains pass about two sprocket wheels (not shown) supported by a shaft 63 extending between the right hand end frames 56. The chains then pass below small sprocket wheels 64 carried by studs projecting from each of the right hand A-frames and proceed towards the left. The chains pass successively over and under a series of sprocket wheels 65, each of which is rotatably mounted on one of the A-frames 54. When the chains reach the left hand ones of the A-frames 54 they pass under sprocket wheels 66, similar to the sprocket wheels 64, and then pass upwardly and about the sprocket wheels 62, as above described. The sprocket wheels 62 are supported on a shaft extending between the end frames 55 at the receiving end of the machine. The means for driving these chains will be described later, all that is necessary to say here being that there is a sprocket wheel 67 (Fig. 2) which is connected with a sprocket wheel fast on the shaft 63 at the extreme right hand end of the machine by a chain 68 so that when the sprocket wheel 67 is driven by said driving means the sprocket wheels carried by shaft 63 will be rotated, thereby driving both of said chains.

The function of the said driving chains is to carry the material to be washed through the series of tanks. In order to accomplish this, the said material is hung from a detachable cross rod 69 (Fig. 1, 2, 9 and 11) in any suitable manner, and this rod is then placed upon the chain at the left hand, or receiving, end of the machine. At spaced intervals throughout its length, each chain is provided with seats 70 (Figs. 1, 7 and 9) which are opposite each other on the two chains and in which the rod 69 is placed. It can be seen that as the chains 61 travel from left to right in Fig. 3, the material to be washed will be carried with them. When the rods reach the end of the last tank they come into contact with a pair of inclined plates 153 secured to the angle iron 60 (Fig. 2) up which they ride, as the conveyer chains continue their travel.

As the rods are forced up the inclined surfaces of these plates they will be raised out of the seats 70, which then pass under the rod. Each of the rods 69 has secured thereto near its ends two depending plates 160. These plates are so located on the rods that they will extend downwardly just inside the tanks, as shown in Fig. 11. They serve the purpose of guards to keep the material hanging from the rods 69 from coming in contact with the sides of the tank and possibly jamming when the rods are transferred from one tank to another. A vertical strengthening rib 161 extends the length of the plates in order to make them more rigid.

Lifting arms

It is apparent that as the chain is moved from left to right to carry the material, it will be necessary, when the material reaches the end of one of said tanks, to lift and transfer it to the next tank in line. The means for accomplishing this function will now be described. The top of each of the A-frames 54 carries a bearing 72 in which is mounted a short shaft 73 fast to which is pinned an arm 74. Pivoted to and depending from this arm 74 is a hook 75. Also fast to the shaft 73 is a disk 77 (Fig. 11) which is bolted to a sprocket wheel 78 (Fig. 9). Keyed to the shaft 57 are bearings 58 to which large sprocket wheels 79 are secured. These sprocket wheels are adapted to engage with and be driven by the main driving chains 61. Inverted L-shaped angle irons 155 are adjacent each A-frame 54 (Figs. 9 and 11) and are secured to the angle irons 60. They serve to keep the chain in engagement with the teeth of sprocket wheels 79. Also fast on the above mentioned bearings 58 are sprocket wheels 80 which are connected to the sprocket wheels 78 by chains 81. It can be seen from the above that when the main driving chains 61 are driven, as above described, the sprocket wheels 79, shaft 57, bearings 58, sprocket wheels 80, chains 81, sprocket wheels 78, shafts 73 and arms 74 will be given a clockwise rotation, as seen in Fig. 9. As the arms 74 and double hooks 75 are in paired relation, and operate synchronously, it is obvious that the hooks 75 will engage the ends of those rods 69 which have been positioned by the chains 61 in the paths of the hooks and will raise said rods and the material carried thereby from the tanks in which the material has been immersed and through which it has been drawn, and deposit it in the adjacent tank. Each of the arms 74 carries a counterbalance 82 to assist the driving mechanism in overcoming the inertia of the loads carried by the supporting rods 69. Secured to each of the angle irons 60 at points adjacent the arcs of inter-section of the lifting arms 74 with the draft carrier chains 61, are two converging curved guide members 145 and 146 (Fig. 9) which are adapted to cooperate with a pin 147 carried by each of the hooks to steady and guide said hooks so as to insure that the hooks shall properly engage the opposite ends of the rod 69.

It can be seen from Fig. 3, which is more or less diagrammatic, that the material is first placed upon a forward extension of the conveyer mechanism supported at its outer end by the frames 55, (Figs. 1 and 3) to form a space at the left or receiving end of the machine, in which there is no tank. The first pair of hooks on the lifting arms 74 that the rod 69 will encounter as the conveyer chains 61 travel towards the right will lift the rod and the material and deposit it as above described in the first tank. It can be seen from this figure that this first tank is a long one and therefore, the material will be moved intermittently or step by step through this tank upon each operation of the machine until there have been six operations. Upon the seventh operation of the machine the rod 69 will encounter the hooks on the second pair of lifting arms 74 which will act as before described and transfer the material to the next tank. This tank is a short one and it is desired to have the material remain therein for only a short period of time. Therefore, another pair of lifting arms is located at the end of this second tank in such a position that the hooks thereon will engage the rod 69 upon the next succeeding operation and transfer the material from this tank to the next. From this figure it can be seen that the length of the tank controls the length of time during which the material will remain in said tank as it moves step by step, and when it comes to the end thereof it is automatically transferred to the next tank. The conveyor chains 61 in this form of the invention, continue to travel during the transfer of the material supporting rods 69 from tank to tank successively, in order to operate the transferring mechanism. Consequently means must be devised to disengage the supporting rods 69 from the conveyor chains 61 as they approach the discharge end of each tank, and to hold the supporting rods in position to be subsequently engaged by the transfer or lifting mechanism.

Furthermore, it is necessary to provide means to which the transfer or lifting mechanism delivers the supporting rods with their loads, and it is desirable that such receiving means be so arranged that a pair of seats 70 on the conveyor approaching the receiving means will engage the supporting rod to remove it from the receiving means and convey it through the said tank, into which it has just been transferred.

In cases where the material is transferred from one tank to the next at each operation of the machine, without traversing the tank but being simply immersed therein, rests 83

(Figs. 9 and 10) are provided to receive the ends of the rods 69 in order to properly position these rods to be engaged by the hooks 75 when the carrying arms 74 of the succeeding lifting or transfer mechanism are next rotated. These rests consist of V-shaped members 83 secured to the angle irons 60 at points within the orbit of travel of the arms 74. Each of the rods 69 carries flanges 84 (Figs. 9 and 10) near its opposite ends which are for the purpose of preventing lateral movement of the rods either while they are carried by the chains or while they lie in the forked rests 83.

In cases where the material is to remain in a certain tank for more than one operation of the machine, a different type of holder is provided, as it is necessary to so construct these holders that the seats 70 on the conveyer chains may pick up the rods 69 and disengage them from the holders. These holders are arranged in pairs, the members of which are located opposite each other and adjacent the respective conveyor chains. Each holder comprises an inclined guiding and supporting member 85 which is secured to the angle iron 60, and a cooperating retaining member 86 which is supported by a vertically extending arm 87 mounted on the bracket 53. Each retaining member 86 has pivoted near its lower end a latch 88. This latch is pivoted at its center, and, as can be seen from Fig. 9, is located in the path of the rod 69. A U-shaped spring 151 mounted on each retaining member 86, serves to yieldingly hold the latch 88 in effective position, shown in Figs. 9 and 18, whereby to retain the ends of the supporting rod 69 on the pair of holding members 85 onto which it has been delivered by the adjacent pair of lifting or transfer arms 74 and their hooks 75, the holders 85, 86 constituting receiving means for the supporting rods 69 and their loads.

As the conveyor chains 61 advance the adjacent pair of seats 70 towards the holding members 85, 86, the high backs of the seats contact the ends of the supporting rod 69 and force the rod against the latches 88 which yield and rock in counterclockwise direction to permit the rod to ride off of the holders 85 onto the seats 70, and be conveyed thereby through the tank.

The latches are reversible, the springs 151 merely pressing against the sides of the latches to frictionally hold them in whatever position they may assume.

The rod 69 as it leaves the holding members 85, turns the latches about a quarter revolution to a substantially horizontal position so that they lie in the path of the next supporting rod which is delivered to the holders, and will be turned thereby another quarter revolution, to substantially vertical position, in which they prevent accidental disengagement of the supporting rod and the holding members.

A guiding device is included in the present machine. This consists of plates 89, one located on each side of the machine just to the left of the position occupied by the rod when the machine is at rest (Figs. 6 and 7). The plates 89 are bent slightly outward so that when the rod 69 is moved by the conveyer chains 61, if it should happen to move laterally out of its normal resting place, the end of said rod will engage the bent portion of the plates 89 on either side and will be returned thereby to its correct position on the conveyor, so that it will be picked up by the lifting arms.

Still another guiding device is provided to guide the rods 69 onto the lugs 70 or guides 83, as the case may be, as they are being lowered into any one of the tanks. This guiding device is for the purpose of properly alining the ends of the rods 69 so that if they should get out of lateral alinement they will again be alined as they are lowered into any tank. Each of the rods 69 has a spool-shaped portion 141 (Figs. 10 and 18) thereon which, as the rod is lowered, is adapted to come into contact with the edge of a stationary plate 142 carried by a member 143 mounted on the projecting brackets 53 of the A-frame 54. If the rod 69 has gotten slightly out of lateral adjustment the contact of the spool-shaped portion 141 with the plate 142 will return said rod to its proper position before the rod is deposited on the seats of the chains. In side elevation, the plate 142 is similar to that of member 86 (Fig. 9) which cooperates with plate 142 in guiding the rod 69.

Driving mechanism

Figure 13:
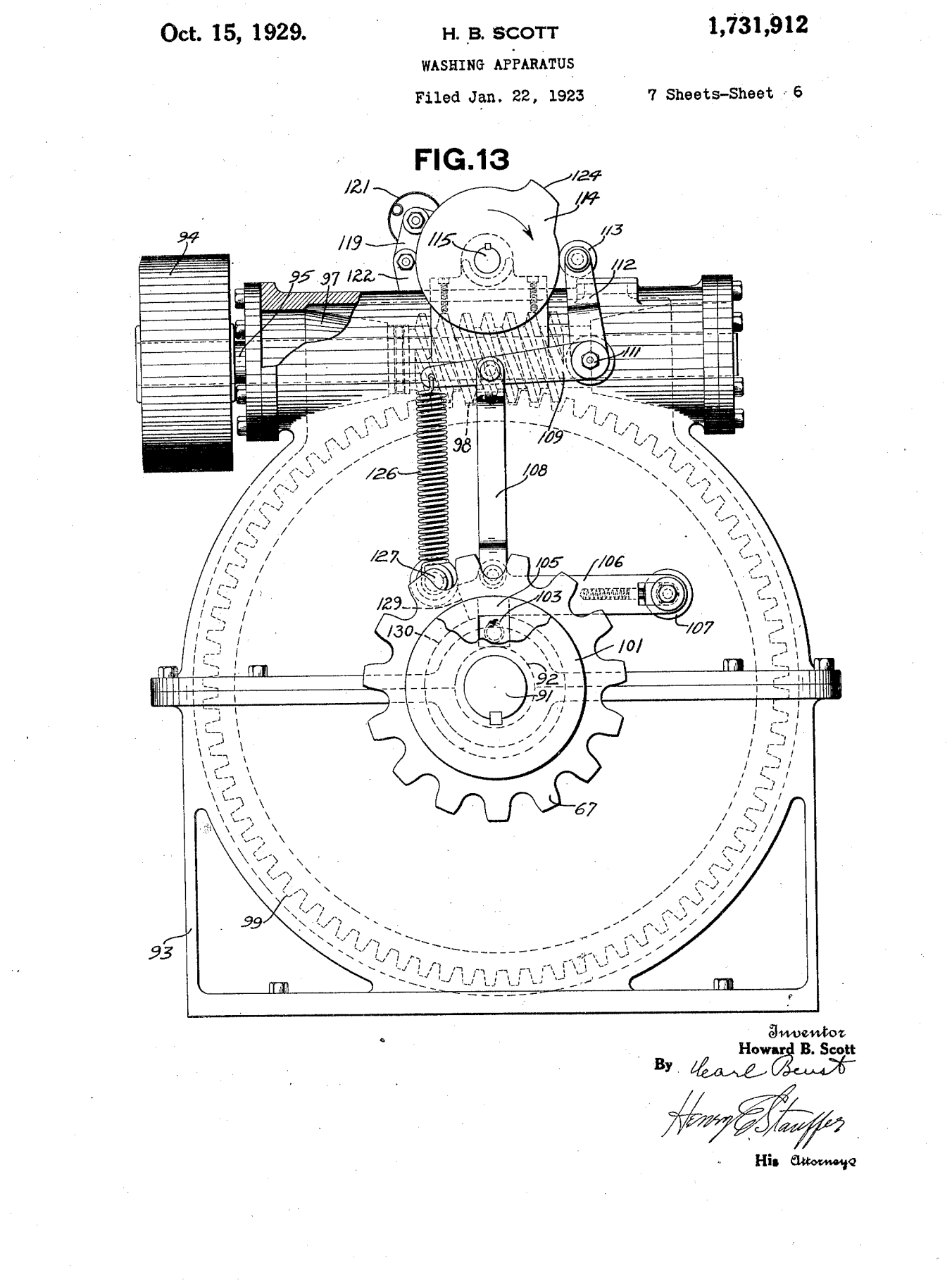

The chains are driven by means of a sprocket wheel 67 (Figs. 2, 12, 13 and 15) above mentioned. This sprocket wheel 67 is fast on a hub 90, which in turn is loosely mounted upon a shaft 91 rotatably mounted in bearings 92 supported by a gear casing 93.

A pulley 94 (Figs. 13 and 17) keyed to a shaft 95 rotatably mounted in bearings 96 supported by members 97 which are bolted to the frame 93, is adapted to be rotated from any desired source of power, as a motor (not shown) to turn the shaft 95. Fast on this shaft 95 is a worm 98 which meshes with the teeth of a worm gear 99 which is keyed to the shaft 91. A ball thrust bearing 100 (Fig. 17) is provided adjacent the worm 98 to take up the end thrust thereof. When the pulley 94 is rotated, the movement will be transferred by means of shaft 95 and worm 98 to the worm gear 99, which in turn will transmit this movement to the shaft 91.

Keyed to the shaft 91 is a disk 101 which has a normally extending notch 102 (Fig. 12) therein. This normally extending notch 102 is adapted to receive the end of an axially shiftable plunger 103 (Fig. 15) which lies in an axially extending slot 104 formed in the hub 90 of the sprocket wheel 67. It is evident that if the plunger 103 is moved into engagement with the notch 102 of the disk 101 the sprocket wheel 67 will be driven with said disk 101 and will through chain 68 and shaft 63, operate the machine as above described.

The plunger 103 coacts with the notch 102 at certain specified intervals in the operation of the machine, whereby to connect the source of power with the driving pulley 67, and the means for controlling this engagement and disengagement will now be described. The plunger 103 has an upwardly extending lug 105. When the plunger 103 is disengaged from the disk 101, as shown in Figs. 12 and 13, an arm 106 lies in front of the upwardly extending lug 105 and prevents the spring from moving said plunger forward into engagement with the notch of the disk 101. The arm 106 is pivotally mounted on a stud 107 projecting from the gear casing 93, its opposite end being connected by a link 108 to an arm 109 fast on a sleeve 110 surrounding a stud 111 projecting from gear casing 93. Also fast on the sleeve 110 is a bifurcated member 112, carrying a roller 113 adapted to contact the periphery of a cam 114 which is keyed to a shaft 115 supported by a cylindrical portion 116 of the gear casing 93. Secured to the opposite end of the shaft 115 is a ratchet 117 with which a pawl 118 cooperates (Figs. 14 and 17). The pawl 118 is pivoted on a plate 119 loosely mounted on a sleeve 120 journaled on the shaft 115. The pawl is held in engagement with the ratchet by means of a spring 121 carried by said plate. Also pivoted to the plate 119 is a rod 122 which, at its lower end, is supported by a member 123 mounted eccentrically on the shaft 91.

From the above description it can be seen that each time the shaft 91 makes one revolution the rod 122 will be raised, which in turn will rock the plate 119 and pawl 118 clockwise about the shaft 115 and, through the engagement of pawl 118 with the ratchet 117, will rotate this ratchet, the shaft 115 and cam 114, which is keyed to this shaft, one step. Retrograde movement of the ratchet is prevented by means of a spring-pressed plunger 148 engaging the teeth thereof and mounted in a block 149 carried by a member 150 secured to the gear casing 93. As the cam rotates, due to the action of the ratchet and pawl, a high portion 124 thereon comes in contact with the roller 113 and rocks the arm 112, sleeve 110, and arm 109 clockwise (Fig. 13) against the tension of a spring 126 extending between the end of the arm 109 and a long stud 127 projecting from the gear casing 93. As the arm 109 is rocked clockwise about the stud 111, the link 108 will be raised to rock the arm 106 clockwise a sufficient distance to disengage the restraining arm from the upwardly extending lug 105 of the spring-pressed plunger 103, which will thereby move forward under the action of its spring and enter the notch 102 in the disk 101 when this portion comes into alinement therewith. It will be remembered that this disk is constantly rotated by the driving means and, therefore, when the plunger 103 enters the notch 102 therein the hub 90 and the sprocket wheel 67 will be rotated with said disk and will thereby drive the chains 61 and the other mechanism of the machine. This movement of the chains will continue until the plunger 103 is forced out of engagement with the notch 102 and held out of such engagement.

The plunger 103 is disengaged by the end 129 of the arm 106 which lies in a circumferentially extending groove 130 in the hub 90, in which the lug 105 lies when the plunger 103 is in locking position.

Assuming the parts to be in the positions shown in Figs. 12 and 13, wherein the sprocket 67 and disk 101 are disconnected, and that power is now transmitted from the motor (not shown) to the pulley 94, shaft 95, worm 98 and worm wheel 99 to turn the disk 101. The disk, being fast on the shaft 91, will turn the latter and the eccentric 123 without, however, turning the sprocket 67. Hence the conveying and transferring mechanisms will remain idle.

But rotation of the eccentric, through link 122, arm 119, pawl 118 and ratchet 117 will turn shaft 115 step by step, and with it the cam 114. The cam has a concentric periphery except for one node 124 adapted to control the coupling plunger 103 to connect the constantly rotating disk 101 and the drive sprocket 67, or effect the disconnection of the disk and sprocket.

In the positions of the parts shown in Fig. 13, the sprocket 67 and disk 101 are disconnected, and the machine is at rest. This is the usual condition in the form of invention herein shown, as the nodal point 124 forms only about one-twelfth of the entire periphery of the cam.

When the ratchet 117 in its step-by-step rotation, turns the cam 114 so as to force the high point 124 thereof against the roll 113 on arm 112 and rock the latter counterclockwise, the arm 109 swings upwardly, drawing with it the link 108 which lifts the control arm 106 out of the groove 130 and above the lug 105 on the plunger bolt 103 to free the bolt to the action of its spring, which forces the bolt to the left (Fig. 12) so that its end bears against the inner face of the disk 100, and as soon as the latter, in its rotation, brings the notch 102 into registry with the bolt, the latter enters the notch and locks the disk and sprocket 67 together, whereupon the machine begins its operative period, to advance the conveyor chains 61 and operate the transfer mechanism.

The node 124 of the cam remains in its effective position to hold the control arm 106 in its idle position while the ratchet feeds the cam around step by step, it being desired that the conveyor advance the distance between two adjacent pairs of seats 70 and that the lifting arms 74 make one complete rotation, during the active period of the cycle of the machine.

This result is obtained in the present instance, by forming the node on the cam disk 114 of sufficient height to hold the control arm 106 elevated until the drive pulley 67 has made one or more complete revolutions, whereupon, as the ratchet 117 feeds the cam disk 114, the node releases the arms 112 and 109 to the action of the restoring spring 126.

Spring 126 will then snap the arm 106 downwardly into its circumferential groove 130 in the hub 90 of the sprocket 67, and shift the roll 113 of arm 112 counter-clockwise against the concentric periphery of the disk 114 in position to be again actuated by the node 124 when it completes its next operation.

It will be remembered that the lug 105 on the plunger 103 lies in the groove 130 of the hub 90 of the pulley 67 when the plunger is in effective position, and the free end of the arm 106 is beveled or cammed as at 129 (Fig. 15), so that when the arm is returned to the groove 130, the beveled end of the arm lies in the path of the lug 105 of the plunger 103, which lug at this time, is rotating with the pulley 67 and its hub 90. When the lug strikes the beveled end 129 of arm 106, the plunger is cammed backwardly against the tension of its spring, as the hub 90 completes its rotation, the plunger withdrawing from the notch 102 to disconnect the power from the machine.

The conveyor and transfer mechanism cease to operate upon the disconnection of the disk 101 and the pulley 67, and remain in the positions occupied at the time of disconnection, until the cam 124 again rocks the arms 112, 109, it being evident that the mechanisms remain idle for, say, eleven-twelfths of the time and are active the remaining twelfth, which results in the intermittent movement heretofore referred to.

Means for tightening driving chains

Means are provided for tightening the main driving conveyor chains 68 and 61 in order to take up any wear thereof. This means consists of an adjustable bearing 132 (Fig. 16), which bearing supports the shaft 63 about which the chains pass at the extreme right hand end of the machine. This bearing is supported by four equally spaced screws 133 supported by portions 134 of each of the right hand frames 56. It can be seen that by loosening two of said screws and tightening the remaining two, the bearing 132 can be moved in any direction in order to either tighten or loosen the main driving chains. Lock nuts 135 are provided on said screws 133 to hold the bearing and shaft in their adjusted positions.

Circuit breaker

If for any reason the hooks 75 should fail to engage one of the rods 69, mechanism is provided whereby the operation of the machine will be stopped. Fast on one pair of the brackets 53 adjacent each of the pairs of A-frames 54 are a pair of plates 135, (Figs. 5 and 8) one on each side of the chains 61, and which at their left hand ends are on a level with said chains. These plates have a gradual incline proceeding towards the right. If one of the rods 69 is not raised by the lifting arms 74, as above described, it will be carried towards the right upon the conveyer 61, and as the ends of the rod 69 ride up the inclined derailing members 135, it will be disengaged from its seat 70 on the conveyer chains 61 and supported by said plates. Fastened to the outside one of said plates 135 is a flat support 136 having two electrical contacts 137 fast thereon. The contacts 137 are separated from the support 136 by any suitable insulating material. Each of these contacts has a terminal post 138, and these terminal posts are wired in series in the circuit which controls the main driving mechanism. The circuit is normally closed by means of a lever 139 which spans the gap between the two contacts 137. If, however, a rod 69 is carried by accident, past the point at which it would be engaged by the transfer arms 74 and hooks 75, or if the transfer mechanism failed to operate, the ends of the rod will ride up the inclined derailing members 135, and strike the upper end of the lever 139 to rock this lever clockwise far enough to break the connection between the two contacts 137 and thereby break the circuit controlling the main driving mechanism, and stop the machine. A spring 140 is wound about the stud upon which lever 139 is pivoted and cooperates with said lever to yieldingly maintain it in any position to which it is shifted.

Operation

The operator, standing at the receiving end of the machine, will place a supporting rod 69 loaded with material to be treated, on the first pair of seats 70 on the conveyor chains 69 traveling from left to right, viewing Fig. 1. The loaded rods 69 may be placed on the conveyor while it is traveling as its speed is slow. The time taken by the conveyor to travel the distance between two succeeding pairs of seats 70 is equal to the time required by the transferring arms 74 in traversing a complete circle. Hence, assuming the operator has placed a loaded supporting rod 69 on the conveyor at point "a", Fig. 1, the load will be conveyed to the point "b", Fig. 1, during the operative period of the cycle, and remain at point "b" during the idle period of the cycle.

The conveyor, during the next operative period, will transport the material from point "b", Fig. 1, to point "c", where the supporting rod 67 and its load is again delayed during the idle period of the cycle, and is still outside the first of the tanks 50.

When in position "c", the ends of the supporting rod 69 lie in the paths of the transfer and lifting hooks 75 and just above such hooks, so that at the beginning of the succeeding operative period, the first pair of transfer arms 74, traveling in clockwise direction (Fig. 1), lift the loaded supporting rod 69, and swinging it throughout the larger part of a circle, deposit the loaded rod in and at the forward end of the first tank 50, as shown in dotted lines in Fig. 1 at "d", where the load remains during the ensuing idle period.

Conveniently, the ends of the loaded supporting rod 69, as the rod approaches the position "c", ride up the inclined ends of short rails 60ª (Figs. 1, 6 and 7) until disengaged from their seats 70, the rod remaining on the horizontal portions of the rails 60ª during the idle period of the cycle, and in position to be engaged and lifted by the transfer arms 74. At the beginning of the next operative period, the hooks 75 pick up the loaded rod 69 as the arms 74 start their orbit of travel, and deposit the material into the first bath or tank.

Receiving fixtures 85.86 (Fig. 9) are placed at the point "d", to which the transferring arms 74 deliver the loaded supporting rods 69 at the forward end of the first tank 50, such fixtures being omitted in Fig. 1, which is diagrammatic in character.

The transferring arms 74 in their travel, deposit the loaded supporting rods 69 onto the rests 85 and pass on to their normal idle positions, thereby releasing the hooks 75 from the rods, which rods are then held against accidental movement by the latches 88, on the members 86.

At the next operative period of the conveyor, that pair of seats 70 adjacent the receiving fixtures 85.86, advances to engage the ends of the supporting rod 69 on the rests 85, and draw the rod with its load towards the right, thereby forcing the rod against the spring-pressed reversible latches 88, which yield to permit the rod to pass off of the rests and be advanced step by step by the conveyor through the first tank 50.

The material to be treated is subjected to the action of the solution in the tank a longer or shorter period of time, depending upon the length of the tank, but as the supporting rod approaches the discharge end of the tank, it rides up on another pair of rails 60ª, which again disengage the rod from its conveyor, at a point within the path of travel of the next pair of lifting arms 74, which transfer the supporting rod and its material into the next tank.

In the particular form selected for illustration, the second tank of the series is one wherein the material is intended to be immersed or dipped only, it not being intended to cause the material to traverse such tank.

Consequently, it is not desired to deliver the supporting rod 69 and its load to the conveyor.

Instead, since the material is merely to remain immersed in the solution in the second tank during one idle period of the cycle, I have contrived the yoke-shaped rests or members 83, a pair of which are located near the receiving end of the second tank at points intersected by the orbit of the second pair of lifting arms 74.

Therefore, when the arms 74 lift the supporting rod and its load out of the first tank to transfer it to the second tank, they deposit the supporting rod with the material to be treated, onto the yoke-shaped rests 83 which hold the material stationary and submerged in the solution in the second tank.

As the material is not transported to the third pair of transfer arms located at the juncture of the second and third tanks, it is necessary to locate the pair of yoke-shaped rests 83 so that they will lie in the paths of travel, not only of the second pair of transfer arms 74 which deposit the supporting rods 69 in the rests, but also of the third pair of transfer arms which, on the next operative period of the cycle, remove the supporting rod and its load from the first pair of rests 83 and deliver the rod and the material supported thereby to the third tank.

As previously stated, the third tank as well as any of the other tanks designed to be traversed by the material, is provided with a pair of receiving holders 85.86 which temporarily retain the rod and its material until, at the succeeding operative period of the cycle, the adjacent pair of seats 70 on the conveyor contact the ends of the rod and advance it together with its load, step by step through the tank.

The foregoing explanation sets forth the general operation of the machine. In the diagrammatic illustration Fig. 3, the material after traversing the third tank is transferred by lifting arms 74 to the fourth tank where it is simply dipped or immersed. Similarly, the material is dipped or immersed in the fifth or sixth tanks, but is delivered to the conveyor in the seventh tank which draws the material to the discharge end of such tank, where it is transferred in the manner heretofore explained, to the eighth or last tank, where it is again delivered to the conveyor.

The supporting rod and its load as it completes its travel through the last tank, rides up on a pair of rails 60ª which disengage it from the conveyor, and at the next operative period, a final pair of arms 74 lifts the rod and its load out of the last tank and delivers it to the discharge section of the conveyor (Fig. 2). At the end of such discharge section, the rod with its material rides up the inclined plates 153 (Fig. 2), and is removed by hand for such further treatment as may be required.

Obviously there is such a relation between the conveyor and the transferring mechanism that when the transfer mechanism is delivering a loaded supporting rod 69 to a pair of receiving holders 85, the conveyor is advancing a pair of seats 70 towards such receiving holders, and by the time the transfer mechanism, after depositing the loaded supporting rod on the receiving holders, has swung around to its normal position, and the machine has entered its period of idleness, the seats 70 have reached a point directly behind the ends of the loaded supporting rod on the receiving holders, preparatory to disengaging the rod from the receiving holders at the beginning of the next operative period of the machine, to advance the material through the tank.

Different arrangements of tanks may be employed without departing from the spirit and scope of my invention.

While the form of mechanism herein shown and described is admirably adapted to fulfill the objects primarily stated, it is to be understood that it is not intended to confine the invention to the one form or embodiment herein disclosed, for it is susceptible of embodiment in various forms all coming within the scope of the claims which follow.

What is claimed is:

1. In a washing machine, the combination of a plurality of tanks, a pair of continuous chains extending along said tanks adapted to move a fixed distance intermittently, a cross rod adapted to rest upon said chains for supporting the material to be washed in said tanks, a plurality of pairs of rotatable arms for transferring said cross rod from one tank to another, seats having converging guide arms for receiving said cross rods from said rotatable arms, a hook pivoted to each rotatable arm and adapted to engage one end of said cross rod, and two converging members to guide said pivoted hook in its engagement with said cross rod.

2. In a washing machine, the combination with a plurality of tanks; a cross rod to support the material to be washed; a pair of endless conveyor chains extending along the sides of said tanks to advance the material-supporting rod a fixed distance intermittently; and oppositely arranged pairs of seats on the conveyor chains, in any pair of which the material-supporting rod may be placed; of a plurality of pairs of pivoted arms to transfer the supporting rod and its material from tank to tank successively; a pair of inclined guide members adapted to receive and support the cross rod and its material when it is lowered into the tank to which it has been transferred; oppositely-inclined guide members adapted to cooperate with the first-named guide members, to guide the cross rod to proper position on the first-named guide members; and latches carried by the second-named guide members to releasably retain the cross rod on the first-named guide members, until the cross-rods are removed therefrom by an adjacent pair of seats on the traveling conveyor chains which slide the cross-rod off the first-named guide members and support and convey the cross-rod until it arrives at the next transfer point.

3. In a washing machine, the combination with a plurality of tanks; a cross rod to support the material to be washed; a pair of endless conveyor chains extending along the sides of said tanks to advance the material-supporting rod a fixed distance intermittently; and oppositely arranged pairs of seats on the conveyor chains, in any pair of which the material-supporting rod may be placed; of a plurality of pairs of pivoted arms to transfer the material-supporting rod from tank to tank successively; a pair of inclined members adapted to receive and support the cross rod and its material when it is lowered into the tank to which it has been transferred; oppositely inclined guide members adapted to cooperate with the first-named guide members, to guide the cross rod to proper position on the first-named guide members; pivoted latches carried by the second-named guide members to releasably retain the cross rod on the first-named guide members until removed therefrom by an adjacent pair of seats on the traveling conveyor chains, which seats, on their advance, contact the cross-rod to shift the cross-rod and its load off of the first-named guide members and onto the seats; and springs to hold the latches in the successive positions to which they are shifted.

4. In a washing machine, the combination with a series of tanks arranged in succession; a conveyor, including a pair of conveyor chains extending along the sides of the series of tanks; pairs of seats located at regular distances apart on the conveyor chains; and a cross rod to support the material to be washed, such cross rod adapted to be placed on any pair of seats to extend between the chains; of a pair of pivoted arms to transfer the cross rod from one tank to another; a positioning member having oppositely beveled flanges located on the cross rod; and an inclined member stationarily mounted in the path of the flanged positioning member on the cross rod as its transfer to the succeeding tank is about completed, and adapted to be contacted by the flanged positioning member to insure that the cross rod shall occupy its correct position laterally relatively to the conveyor chains.

5. In a washing machine, the combination of a plurality of tanks arranged in a line, cross rods for supporting the material to be washed in said tanks, a pair of endless chains to convey said cross rods, and having pairs of seats on which the cross-rods rest; a plurality of pairs of rotatable arms for lifting said cross rods and the material supported thereon bodily from one tank to the next, pivoted depending hooks on said arms, and converging members to guide each hook for maintaining said hooks in vertical position as they approach one of said cross rods for engagement.

6. In a washing machine, the combination with a series of tanks; a pair of endless chains extending along the tanks; corresponding seats carried by the respective chains to form pairs of seats; and a cross rod removably mounted on a pair of the seats and adapted to support the material to be washed; of a plurality of pairs of rotatable arms to transfer the cross rod from one tank to another; stationary holders having surfaces slightly higher than the seats and past which the seats travel, and onto which the rod is deposited by the rotatable arms in transferring the rod and its load from tank to tank; and carrying lugs located on the chains adjacent the seats to shift the rod off of the holders and onto the adjacent pair of seats as the seats and their lugs pass by the holders, to enable the seats to convey the rod and its load through the tanks.

7. In a washing machine, the combination with a series of tanks, a pair of endless chains extending along said tanks, and a series of spaced cross-rods removably resting on the chains for supporting the material to be washed; of a plurality of pairs of rotatable arms for transferring said cross-rods from one tank to another; holders for receiving the rod from the rotatable arms; a pivoted double-ended reversible latch for each holder, either end of each latch being adapted to maintain the rod on its holder; and carrying lugs on the chains for drawing the rods off of the holders and tripping the double-ended latches to permit the rod to be conveyed by the chain, the succeeding cross-rod, when transferred, adapted to position the other end of the double-ended latch to hold said last-named rod on the holders.

8. In a washing machine, the combination of a series of tanks, a pair of chains extending along the tanks, a rod for supporting the material to be washed, seats on said chains to loosely support the rod, lifting means to lift the rod off of the seats, and stationary guides in the paths of the rods and against which the rods wipe, the guides adapted to laterally position and center the rods relatively to the lifting means as the rods approach the lifting means.

In testimony whereof I affix my signature.
HOWARD B. SCOTT.